(12) United States Patent
Kuo et al.

(10) Patent No.: US 7,729,067 B2
(45) Date of Patent: Jun. 1, 2010

(54) LENS HOLDER AND LENS APPARATUS HAVING SAME

(75) Inventors: Pei-Ching Kuo, Taipei Hsien (TW); Hsin-Li Lin, Taipei Hsien (TW); Yung-Teng Wu, Taipei Hsien (TW); Sheng-An Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 87 days.

(21) Appl. No.: 12/202,332

(22) Filed: Sep. 1, 2008

(65) Prior Publication Data

US 2009/0323207 A1 Dec. 31, 2009

(30) Foreign Application Priority Data

Jun. 30, 2008 (CN) .......................... 2008 1 0302447

(51) Int. Cl.
*G02B 7/02* (2006.01)
(52) U.S. Cl. ...................................... 359/823; 359/819
(58) Field of Classification Search ......... 359/694–701, 359/819–824
See application file for complete search history.

(56) References Cited

U.S. PATENT DOCUMENTS

2008/0192363 A1* 8/2008 Shirono et al. .............. 359/698

* cited by examiner

*Primary Examiner*—Mohammed Hasan
(74) *Attorney, Agent, or Firm*—Zhigang Ma

(57) ABSTRACT

A lens holder coupling a lens to an actuator is disclosed. The actuator includes a vibrator and a driving rod coupled to the vibrator along a vibration direction of the vibrator. The lens holder includes a lens carrier, a transmission member, a guiding member, and a fixing member. The lens carrier is configured for accommodating the lens. The transmission member connected to the lens carrier defines a groove having a transmission axis parallel to an optical axis of the lens receiving the driving rod. The guiding member connected to the lens carrier defines a hole receiving a guide rod substantially parallel to the optical axis of the lens. The fixing member includes a main body and an elastic sheet, the main body being fixed to the transmission member, the elastic sheet extending from the main body and covering the groove and configured for elastically contacting the driving rod.

19 Claims, 4 Drawing Sheets

LENS HOLDER AND LENS APPARATUS HAVING SAME

BACKGROUND

1. Technical Field

The invention relates to lenses and, more particularly, to a lens holder coupling a lens to an actuator and lens apparatus having the same.

2. Description of the Related Art

Generally, a piezoelectric actuator includes a vibrator and a driving rod coupled thereto. In a lens apparatus, a lens holder integrally formed with a transmission portion is employed and coupled to a piezoelectric actuator by insertion of the driving rod through the transmission portion. The piezoelectric actuator and the lens holder are difficult to disassemble. As a result, in the event of damage, it is difficult to reuse the lens holder or the piezoelectric actuator, if either of them is still workable.

Therefore, it is desirable to provide a lens holder and lens apparatus addressing the described limitations.

SUMMARY

A lens holder coupling a lens to an actuator is disclosed. The actuator includes a vibrator and a driving rod coupled to the vibrator along a vibration direction of the vibrator. The lens holder includes a lens carrier, a transmission member, a guiding member, and a fixing member. The lens carrier is configured for accommodating the lens. The transmission member connected to the lens carrier defines a groove having a transmission axis parallel to an optical axis of the lens receiving the driving rod. The guiding member connected to the lens carrier defines a hole receiving a guide rod substantially parallel to the optical axis of the lens. The fixing member includes a main body and an elastic sheet, the main body being fixed to the transmission member, the elastic sheet extending from the main body and covering the groove and configured for elastically contacting the driving rod.

BRIEF DESCRIPTION OF THE DRAWINGS

Many aspects of the present lens holder and lens apparatus should be better understood with references to the following drawings. The components in the drawings are not necessarily drawn to scale, the emphasis instead being placed upon clearly illustrating the principles of the present lens holder and the lens apparatus. Moreover, in the drawings, like reference numerals designate corresponding parts throughout the several views.

DETAILED DESCRIPTION OF EMBODIMENTS

Embodiments of the present lens holder and lens apparatus will now be described in detail with references to the drawings.

Figure 1:
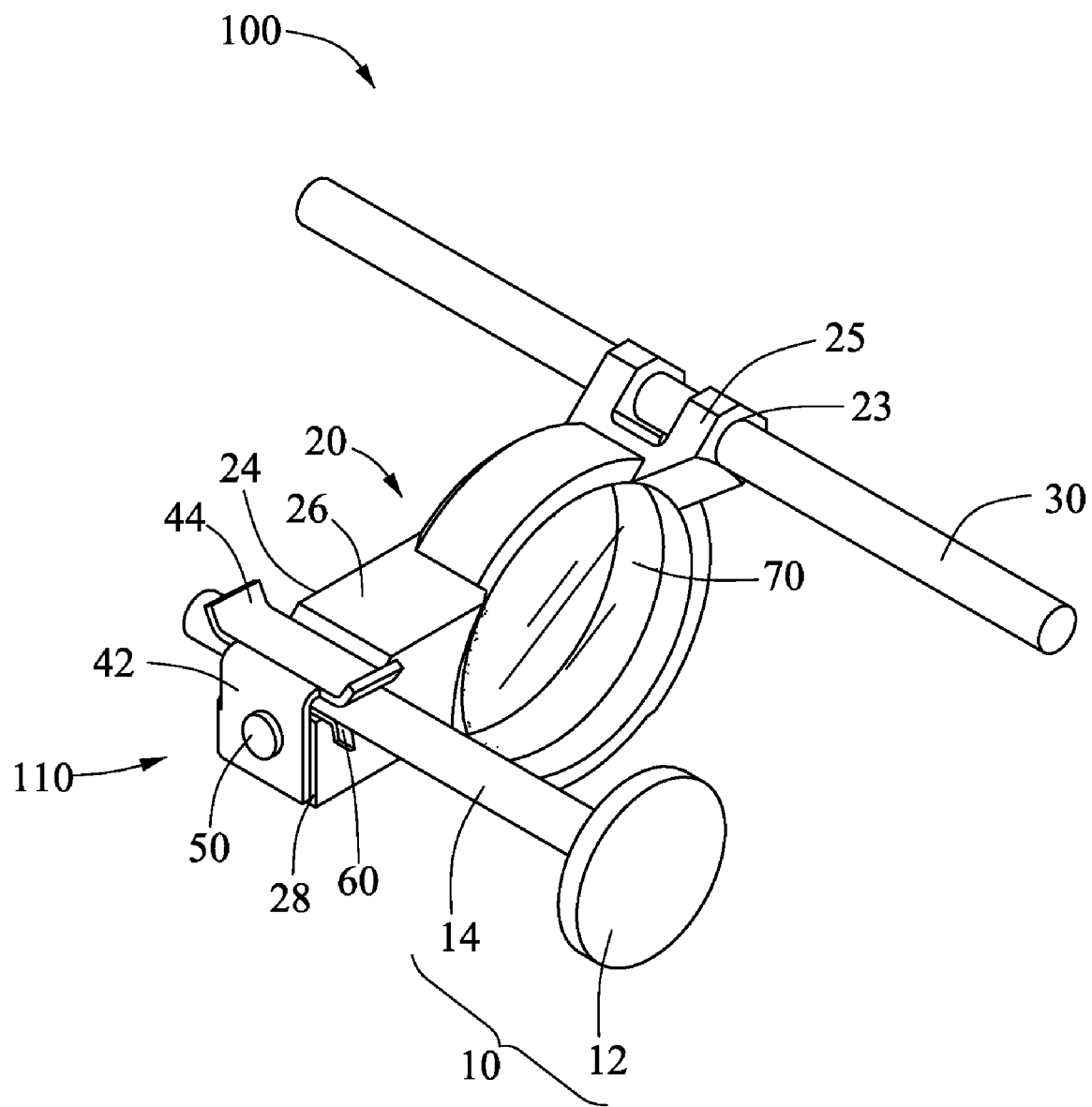
FIG. 1 is an isometric view of a lens apparatus, according to a first exemplary embodiment.
Figure 2:
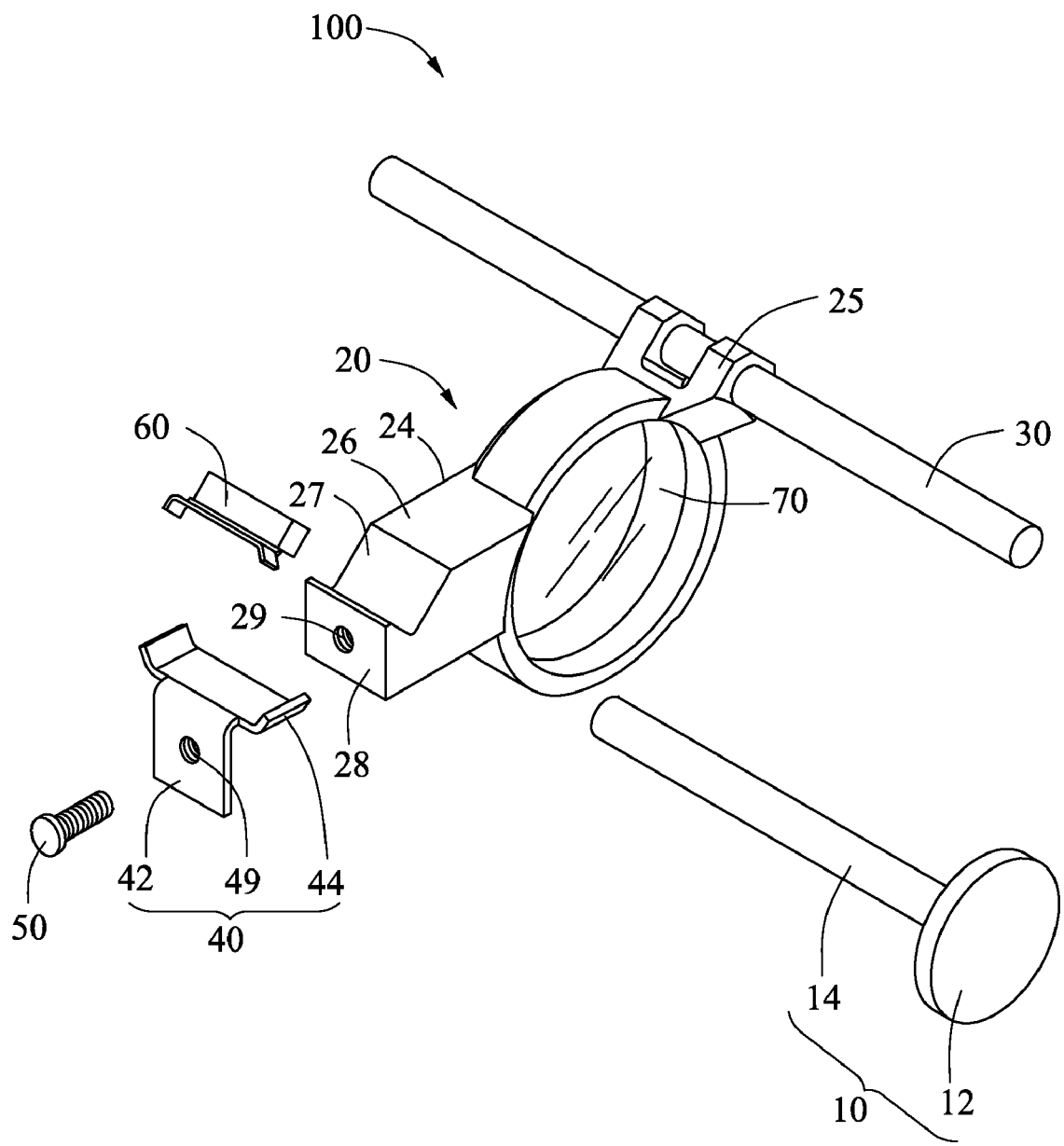
FIG. 2 is an exploded view of the lens apparatus of FIG. 1.

Referring to FIG. 1 and FIG. 2, a lens apparatus 100, according to a first exemplary embodiment, is shown. The lens apparatus 100 includes a lens 70, an actuator 10, a guide rod 30, and a lens holder 110.

The lens holder 110 includes a lens carrier 20, a transmission member 24, a guiding member 25, and a fixing member 40. The lens carrier 20 is barrel-shaped. The lens 70 is received in the lens carrier 20. The transmission member 24 and the guiding member 25 are fixed to the lens carrier 20. In this embodiment, the lens carrier 20, the transmission member 24, and the guiding member 25 are integrally formed.

The transmission member 24 has a first peripheral surface 26 adjacent to the lens carrier 20 and a second peripheral surface 28 perpendicular to the first peripheral surface 26. The first peripheral surface 26 defines a groove 27 therein. The groove 27 defines a transmission axis substantially parallel to an optical axis of the lens 70. The groove 27 can be V-shaped or L-shaped. In this embodiment, the groove 27 is V-shaped.

The guiding member 25 includes a hole 23 receiving the guide rod 30, formed substantially parallel to the optical axis of the lens 70 guiding the lens carrier 20 along the guide rod 30, thereby providing zoom/focus function of the lens 70 received in the lens carrier 20.

The fixing member 40 includes a main body 42 and an elastic sheet 44. The elastic sheet 44 extending from the main body 42 is substantially perpendicular to the main body 42. When the main body 42 is attached to the second peripheral surface 28 of the transmission member 24, the elastic sheet 44 covers the groove 27 to elastically contact the driving rod 12 of the actuator 10. In detail, the second peripheral surface 28 defines a threaded hole 29 therein. The main body 42 defines a through hole 49 therein matching the threaded hole 29. Thus, the main body 42 can be attached to the first peripheral surface 28 by insertion of a screw 50 through the through hole 49 and into the threaded hole 29.

The actuator 10 includes a vibrator 12 and a driving rod 14. In this embodiment, the actuator 10 is a piezoelectric actuator. The driving rod 14 is coupled to the vibrator 12 along a vibration direction of the vibrator 12. In this embodiment, the vibration direction of the vibrator 12 is perpendicular to the optical axis. When electric power is applied thereto, the vibrator 12 vibrates, reciprocally driving the driving rod 14. Furthermore, in order to accommodate driving rods 14 of different sizes, the lens holder 110 also includes a space-adjusting block 60, disposed in the groove 27 to adjust the dimensions of the space defined by the groove 27 and the elastic sheet 44 for fittingly enclosing the driving rod 14. The space-adjusting block 60 match the shape of groove 27, such as an L or V shape. In this embodiment, the space-adjusting block 60 is V-shaped.

Figure 3:
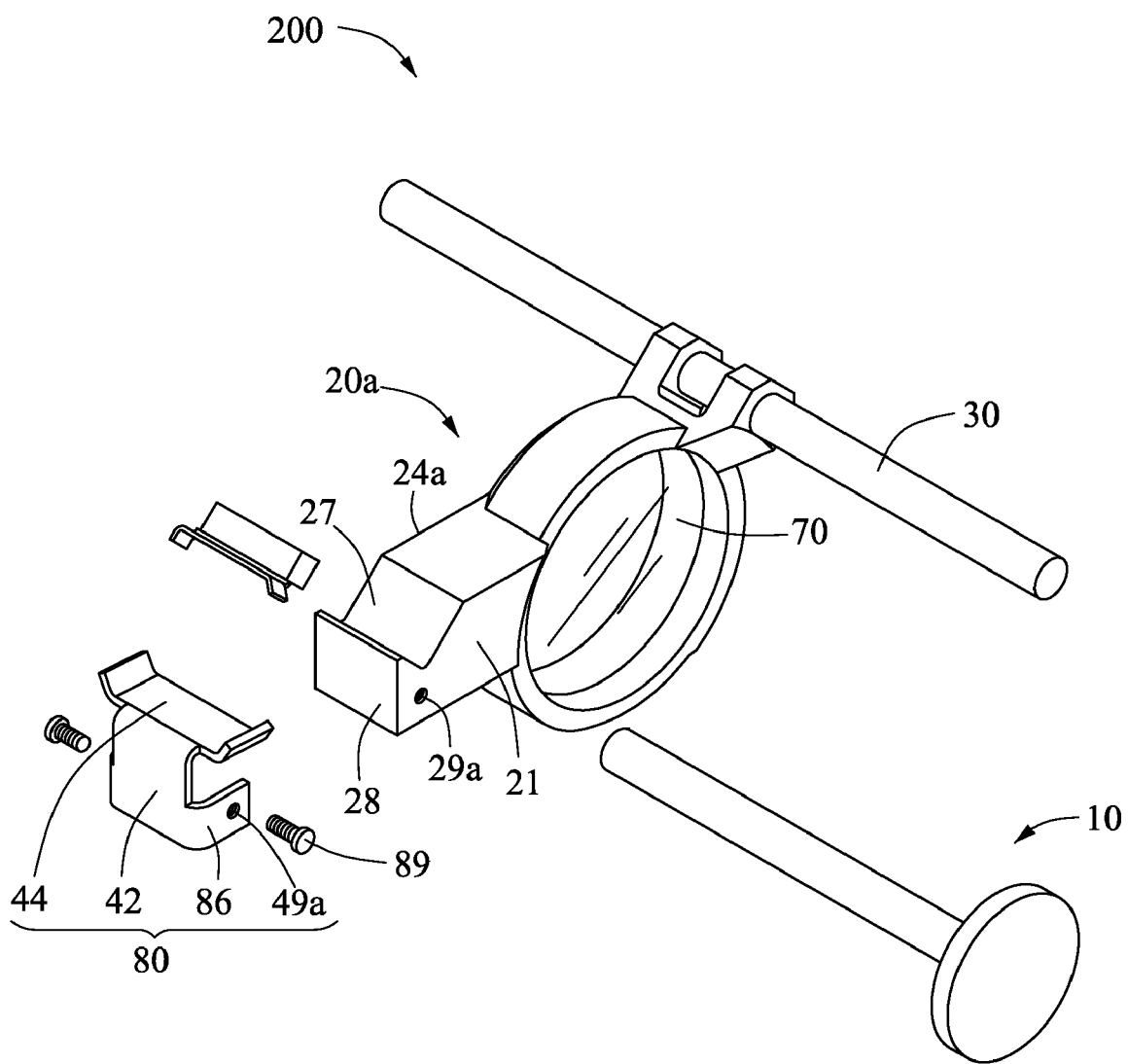
FIG. 3 is an exploded view of a lens apparatus, according to a second exemplary embodiment.

Referring to FIG. 3, a lens apparatus 200 is shown, differing only from lens apparatus 100 in the inclusion of a lens carrier 20a and a fixing member 80.

The lens carrier 20a includes a transmission member 24a. The transmission member 24a differs from the transmission member 24 in that threaded holes 29a are respectively positioned on two opposite second surfaces 21 adjacent to the second peripheral surface 28 of the transmission member 24 corresponding to the groove 27 (only one threaded hole 29a on the second surface 21 is shown in FIG. 3).

The fixing member 80 differs from the fixing member 40 in that two holding sheets 86 extending from the main body 42 along the same direction as the elastic sheet 44, perpendicular to the main body 42 (only one holding sheet 86 is shown in FIG. 3). The two holding sheets 86 have two through holes 49a respectively and are configured for wrapping the two opposite second surfaces 21. When the fixing member 80 is attached to the transmission member 24a, the through holes 49a of the two holding sheets 86 receive two screws 89, subsequently received in the threaded holes 29a of the opposite second surfaces 21. When triggered, the actuator 10 fixed on the lens carrier 20a through the fixing member 80, moves the lens carrier 20a together with the actuator 10 along the guide rod 30 to perform zoom/focus functions.

Figure 4:
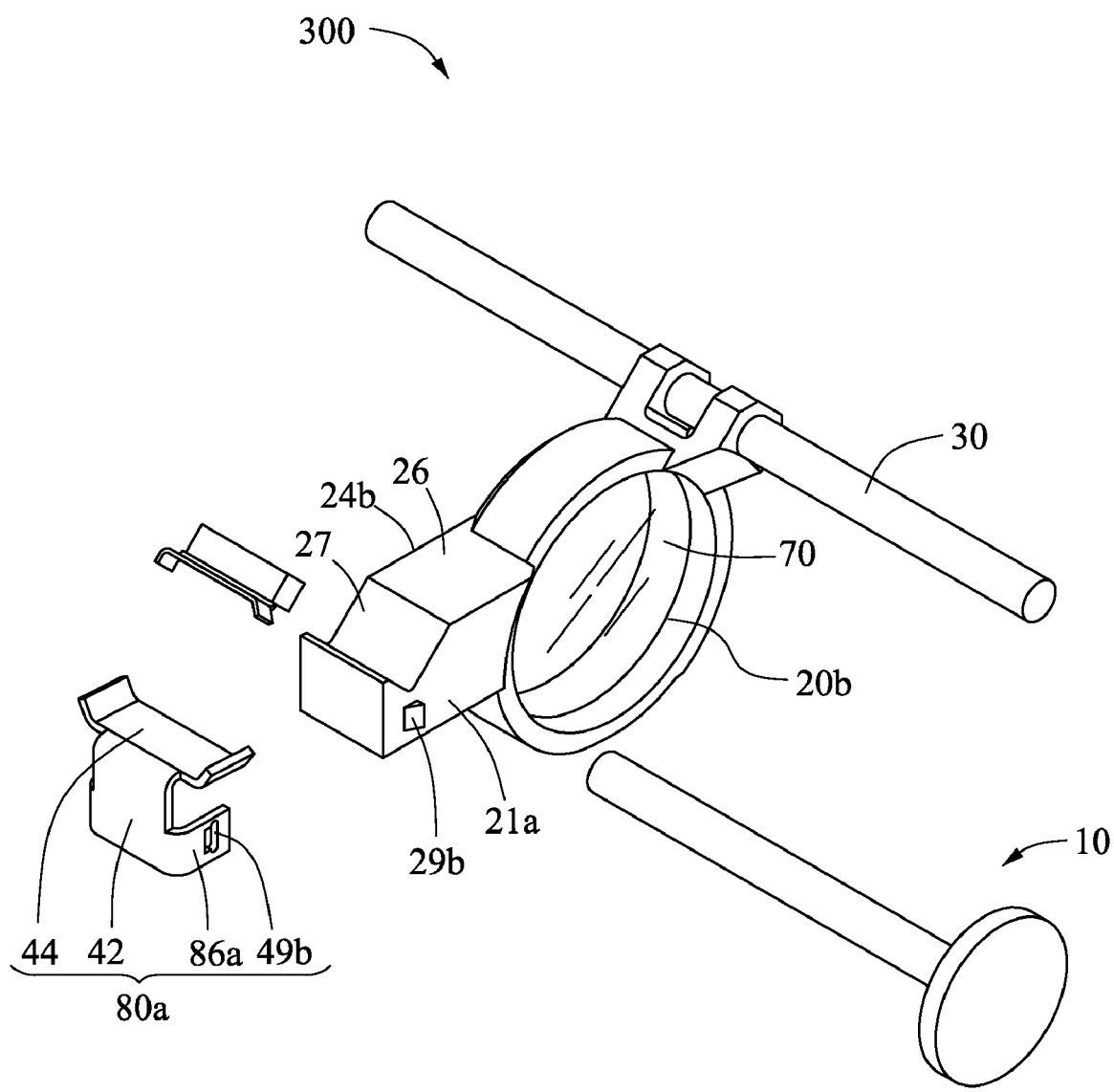
FIG. 4 is an exploded view of a lens apparatus, according to a third exemplary embodiment.

Referring to FIG. 4, a lens apparatus 300 is shown, differing from the lens apparatus 200 only in the inclusion of a lens carrier 20b and a fixing member 80a.

The lens carrier 20b includes a transmission member 24b, differing from transmission member 24a only in that engagement portions 29b are formed on the two opposite second surfaces 21a corresponding to the groove 27 (only one portion 29b on the second surface 21a is shown in FIG. 4).

The fixing member 80a differs from fixing member 80 only in that two holding sheets 86a extend from the main body 42 along the same direction as the elastic sheet 44, perpendicular to the main body 42. The two holding sheets 86a have two engagement-receiving holes 49b and face each other. When the fixing member 80a is attached to the transmission member 24b, the engagement-receiving holes 49b of the two holding sheets 86a engage the corresponding engagement portions 29b of the transmission member 24b. Thus, when triggered, the actuator 10 fixed on the lens carrier 20b, through the fixing member 80a, moves the lens carrier 20b together with the actuator 10 along the guide rod 30 to perform zoom/focus functions.

It is to be noted that the lens apparatuses 100, 200, 300 can have a number of lens holders 110.

Each of the lens apparatuses 100, 200, 300 respectively has fixing members 44, 80, 80a configured for fastening the actuators 10 to the lens carriers 20, 20a, 20b. The actuator 10 can be separated from each of the lens carriers 20, 20a, 20b, so that the actuator 10 or each of the lens carriers 20, 20a, 20b can be replaced if necessary.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A lens holder coupling a lens to an actuator comprising a vibrator and a driving rod, the driving rod coupled to the vibrator along a vibration direction of the vibrator, the lens holder comprising:
   a lens carrier configured for accommodating the lens;
   a transmission member connected to the lens carrier and defining a groove therein for receiving the driving rod, the groove defining a transmission axis substantially parallel to an optical axis of the lens;
   a guiding member connected to the lens carrier and defining a hole therein, the hole receiving a guide rod substantially parallel to the optical axis of the lens; and
   a fixing member comprising a main body and an elastic sheet, the main body being fixed to the transmission member, the elastic sheet extending from the main body and covering the groove and being configured for elastically contacting the driving rod.

2. The lens holder of claim 1, wherein the transmission member defines a threaded hole in a first surface facing the main body, the main body defining a through hole therein, the fixing member is able to be fixed to the transmission member by a screw via the threaded hole and the through hole.

3. The lens holder of claim 1, wherein the transmission member defines two threaded holes in two opposite second surfaces perpendicular to the transmission axis; the fixing member further comprises two holding sheets extending from the main body and wrapping the second surfaces respectively, the two holding sheets define two through holes therein respectively, corresponding to the two threaded holes, the fixing member is able to be fixed to the transmission member by screws via the threaded holes and the through holes.

4. The lens holder of claim 3, wherein the through holes are threaded.

5. The lens holder of claim 1, wherein the transmission member forms two engagement portions on two opposite second surfaces perpendicular to the transmission axis, the fixing member further comprises two holding sheets extending from the main body and wrapping the second surfaces, the holding sheets define two engagement-receiving holes respectively which are capable of engaging the engagement portions respectively.

6. The lens holder of claim 1, further comprising a space-adjusting block disposed in the groove, the space-adjusting block being configured for adjusting the dimensions of the space defined by the groove and the elastic sheet.

7. The lens holder of claim 6, wherein the groove is L-shaped.

8. The lens holder of claim 7, wherein the space-adjusting block is L-shaped.

9. The lens holder of claim 6, wherein the space-adjusting block is V-shaped.

10. A lens apparatus, comprising:
    a lens;
    an actuator comprising a vibrator and a driving rod, the driving rod coupled to the vibrator along a vibration direction thereof;
    a guide rod substantially parallel to an optical axis of the lens; and
    a lens holder comprising:
       a lens carrier configured for accommodating the lens;
       a transmission member connected to the lens carrier and defining a groove therein for receiving the driving rod, the groove defining a transmission axis substantially parallel to the optical axis of the lens;
       a guiding member connected to the lens carrier and defining a hole therein, the hole fitting into the guide rod; and
       a fixing member comprising a main body and an elastic sheet, the main body being fixed to the transmission member, the elastic sheet extending from the main body and covering the groove and being configured to elastically contact the driving rod.

11. The lens apparatus of claim 10, wherein the transmission member defines a threaded hole in a first surface facing the main body, the main body defining a through hole therein, the fixing member is able to be fixed to the transmission member by a screw via the threaded hole and the through hole.

12. The lens apparatus of claim 10, wherein the transmission member defines two threaded holes in two opposite second surfaces perpendicular to the transmission axis; the fixing member further comprises two holding sheets extending from the main body and wrapping the second surfaces respectively, the two holding sheets define two through holes therein respectively, corresponding to the two threaded holes, the fixing member is able to be fixed to the transmission member by screws via the threaded holes and the through holes.

13. The lens apparatus of claim 12, wherein the through holes are threaded.

14. The lens apparatus of claim 10, wherein the transmission member forms two engagement portions on two opposite second surfaces perpendicular to the transmission axis, the fixing member further comprises two holding sheets extending from the main body and wrapping the second surfaces, the holding sheets define two engagement-receiving holes respectively which are capable of engaging the engagement portions respectively.

15. The lens apparatus of claim 10, further comprising a space-adjusting block disposed in the groove, the space-adjusting block configured for adjusting the dimension of the space defined by the groove and the elastic sheet.

16. The lens apparatus of claim 15, wherein the groove is L-shaped.

17. The lens apparatus of claim 15, wherein the space-adjusting block is L-shaped.

18. The lens apparatus of claim 15, wherein the space-adjusting block is V-shaped.

19. The lens apparatus of claim 10, wherein the lens apparatus has a plurality of the lens holders.

* * * * *